United States Patent [19]

Janopaul, Jr.

[11] Patent Number: 4,566,238

[45] Date of Patent: Jan. 28, 1986

[54] ENERGY CONSERVING CONCRETE MASONRY UNIT, WALL CONSTRUCTION AND METHOD

[76] Inventor: Peter Janopaul, Jr., 1301 Payne Ave., Modesto, Calif. 95351

[21] Appl. No.: 555,654

[22] Filed: Nov. 28, 1983

Related U.S. Application Data

[63] Continuation-in-part of Ser. No. 499,674, Jun. 6, 1983, abandoned, which is a continuation of Ser. No. 337,817, Jan. 7, 1982, abandoned.

[51] Int. Cl.⁴ .............................................. E04B 2/26
[52] U.S. Cl. ....................................... 52/407; 52/437
[58] Field of Search ............... 52/425, 426, 562, 56 B, 52/437, 439, 309.12, 606, 607, 504, 505, 405, 407

[56] References Cited

U.S. PATENT DOCUMENTS 3,204,381  9/1965  Perreton ................................. 52/407

FOREIGN PATENT DOCUMENTS 670134  8/1929  France ................................. 52/437
 4971  of 1906  United Kingdom .................. 52/426

Primary Examiner—James L. Ridgill, Jr.
Attorney, Agent, or Firm—Flehr, Hohbach, Test, Albritton & Herbert

[57] ABSTRACT

A wall constructed to function as a passive thermal mass for energy storage permits enhanced solar heating and nocturnal cooling of the interior of a building using walls as disclosed. Use of an expansive insulating material, foamed in place, seals the wall to make it waterproof. Concrete masonry units having inner and outer cells are stacked to form the wall. A hardenable material poured into the inner cells of the masonry units moves both vertically and horizontally within the wall to form a rigid wall structure. Introducing insulation in fluid form into the outer cells adjacent to those containing the hardenable material disposes the insulation to lie essentially adjacent the thermal mass of the rigid inner wall structure.

3 Claims, 14 Drawing Figures

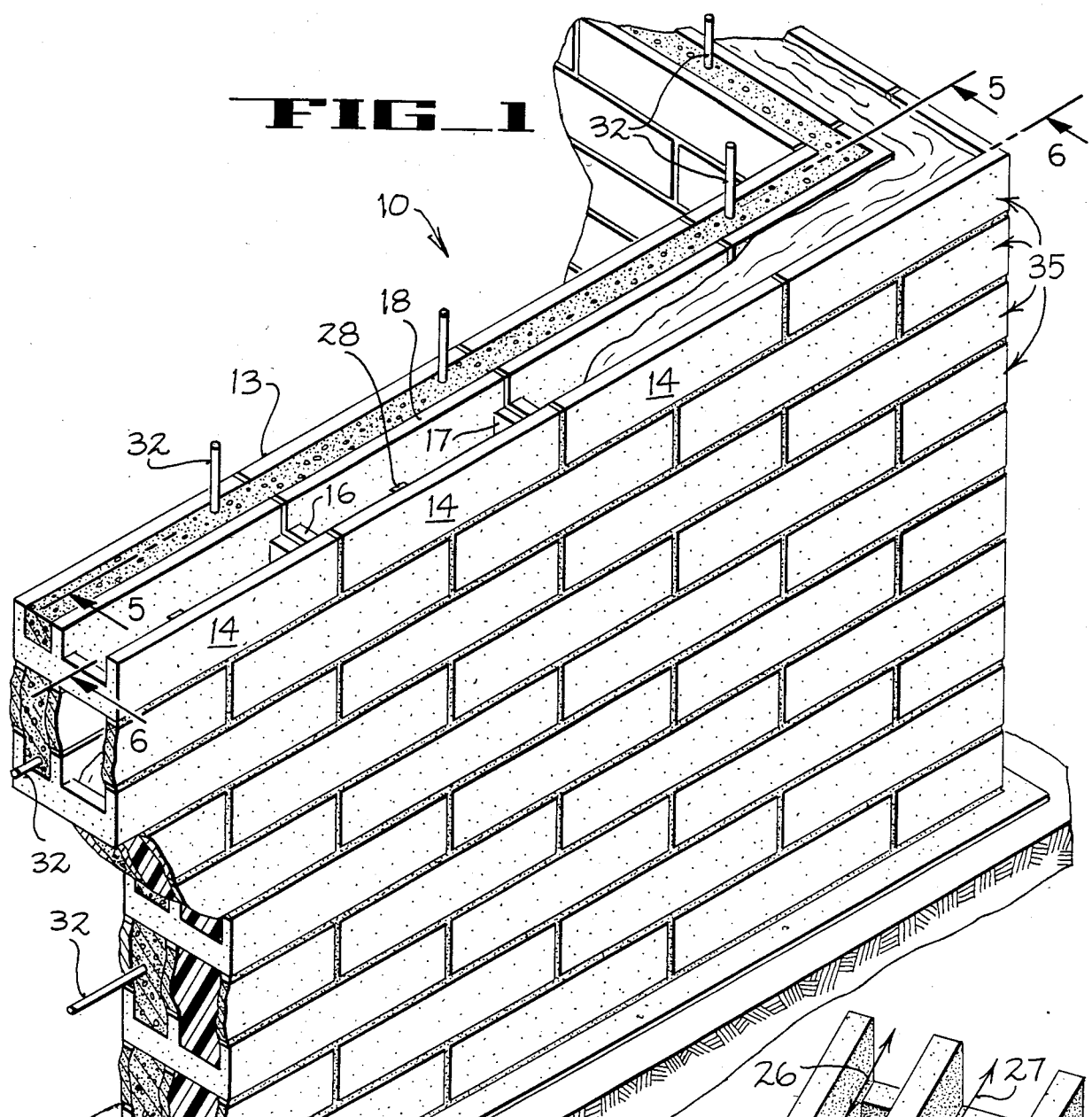
FIG_1
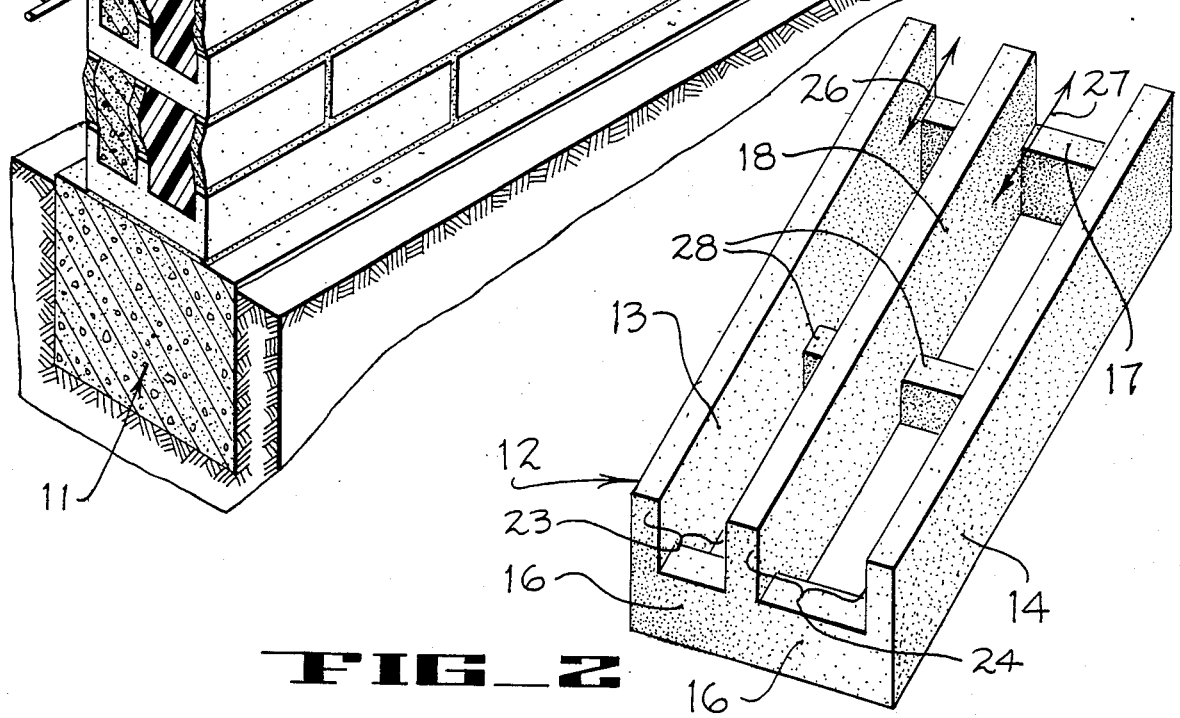
FIG_2

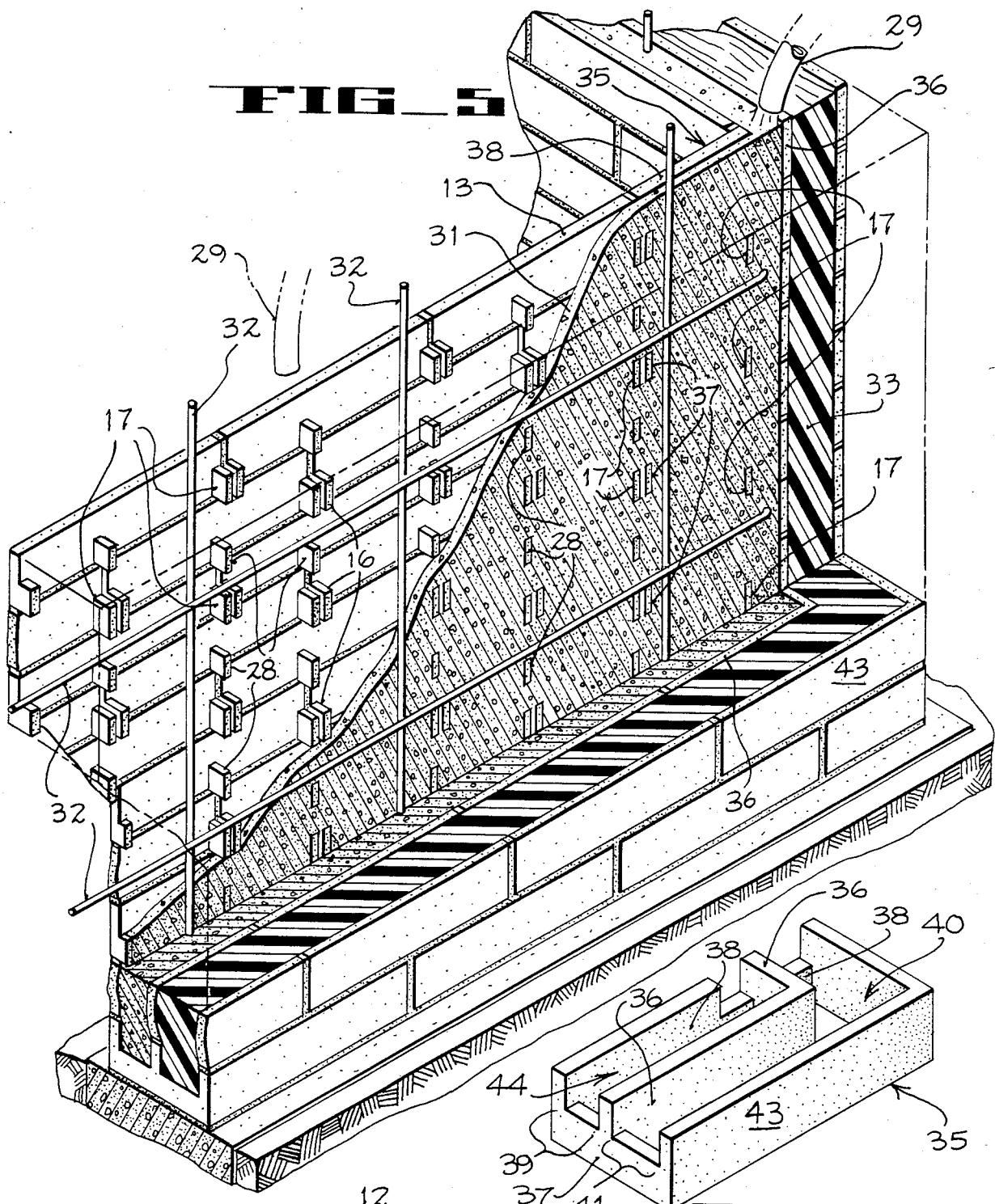

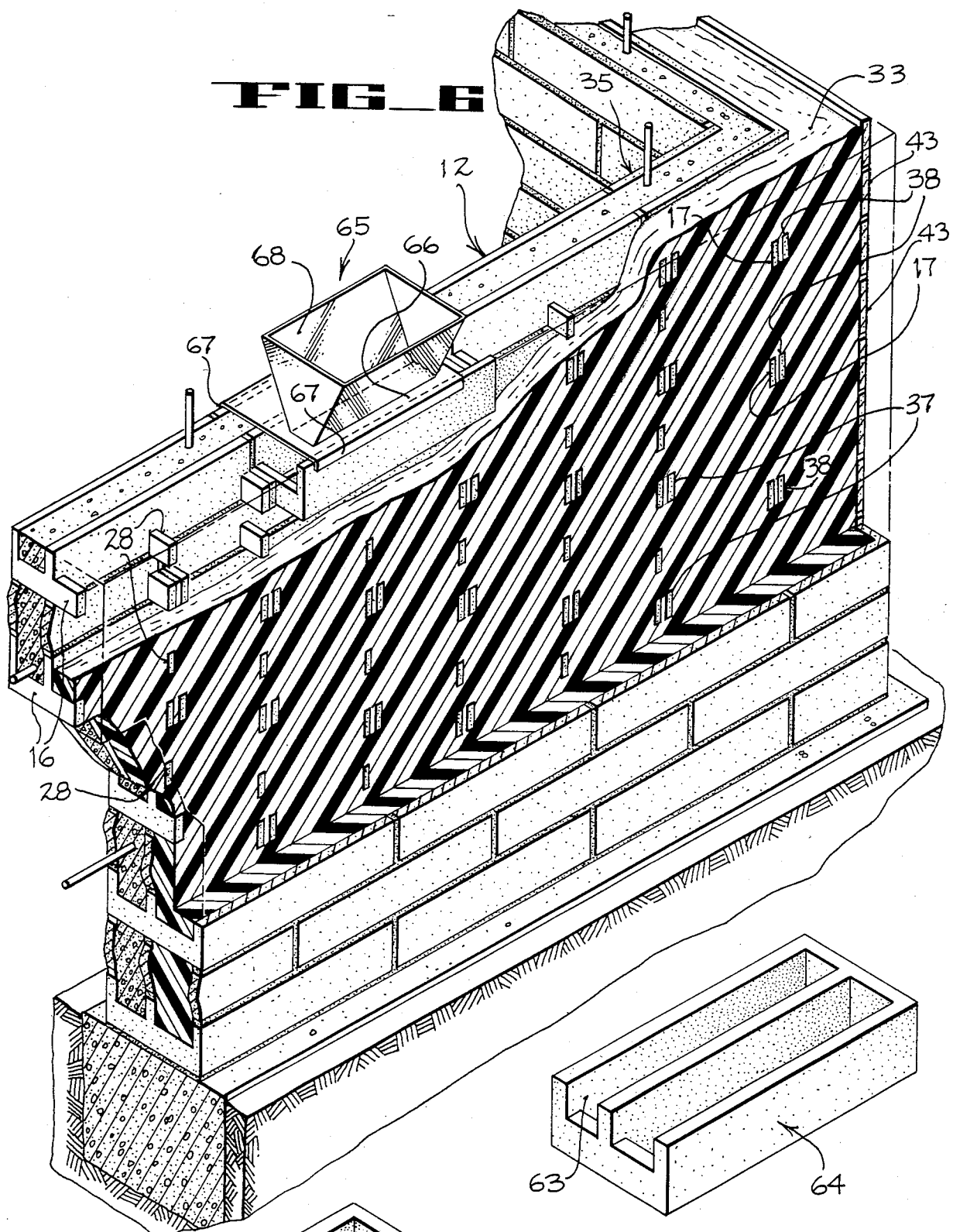

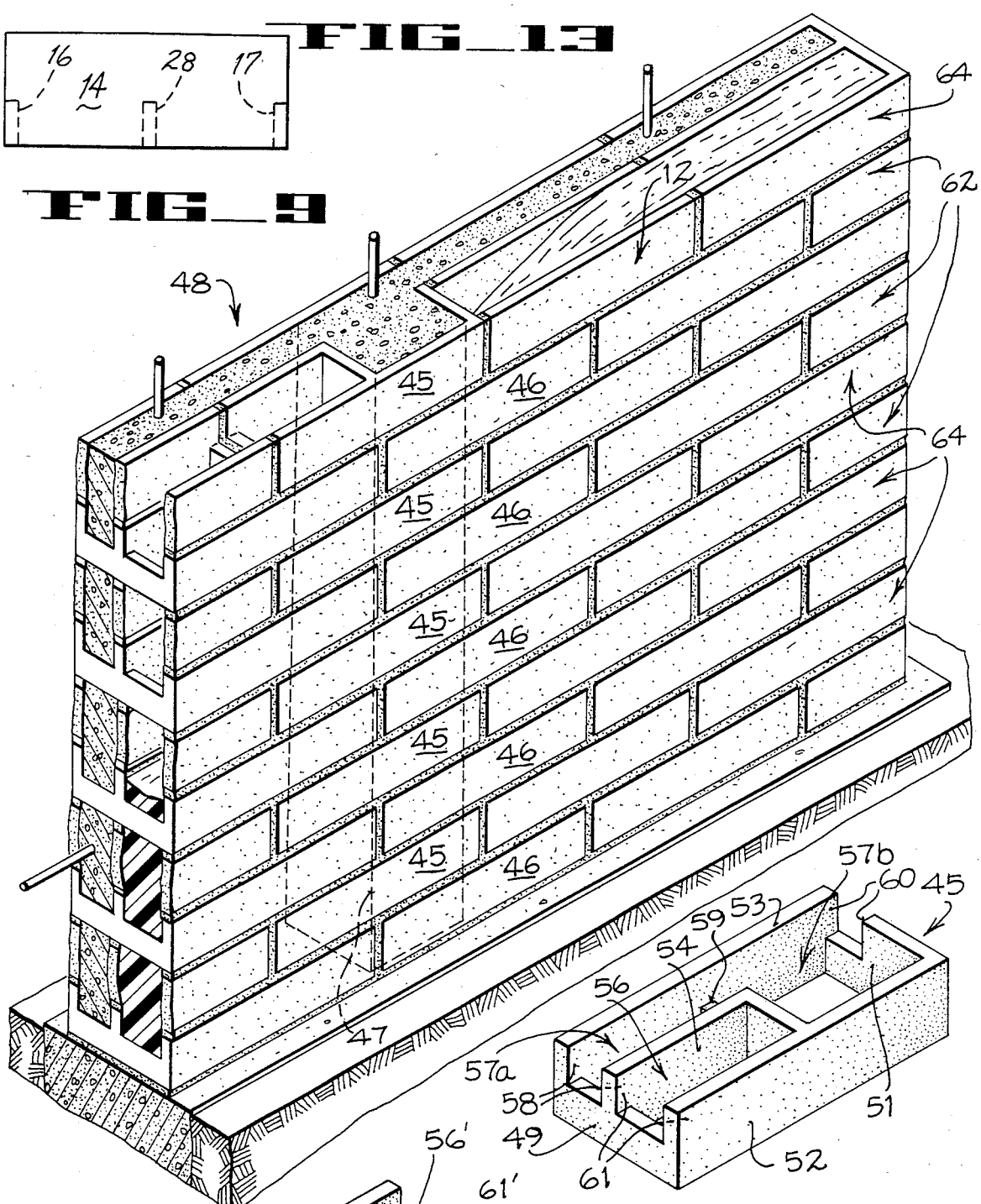

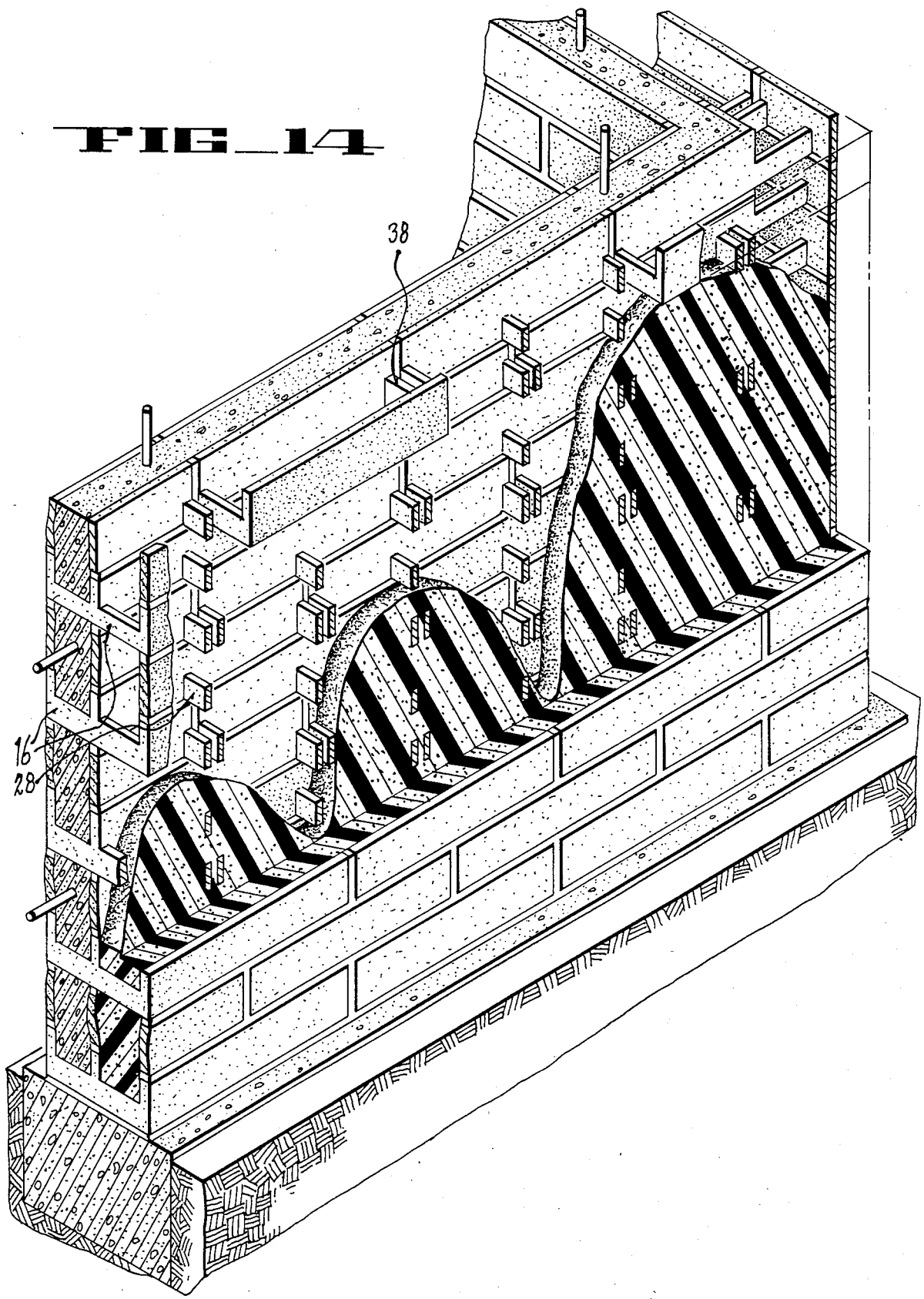

ENERGY CONSERVING CONCRETE MASONRY UNIT, WALL CONSTRUCTION AND METHOD

This is a continuation-in-part of Peter Janopaul, Jr. application Ser. No. 499,674, filed June 6, 1983, now abandoned entitled ENERGY CONSERVING CONCRETE MASONRY UNIT AND WALL CONSTRUCTION, which is a continuation of Peter Janopaul, Jr. application Ser. No. 337,817, filed Jan. 7, 1982, entitled ENERGY CONSERVING CONCRETE MASONRY UNIT AND WALL CONSTRUCTION, now abandoned.

This invention pertains to a concrete masonry unit for use in constructing the exterior walls of a building in a manner providing improved passive solar heating and nocturnal cooling of the interior of the building. The invention pertains more particularly to an improved concrete unit and wall of a type wherein within the wall insulation can be readily enclosed to lie alongside a concrete structural wall portion. Forming an inner wall portion with the insulation forming an outer wall portion.

As disclosed further below a concrete masonry unit and wall structure provide an improved insulating unit for retaining heat within a building during winter when passive solar heating principles can cut energy consumption and which also serves to inhibit the transfer of heat from external surfaces of the wall to internal surfaces thereof during summer when nocturnal cooling principles can be used to cut energy consumption. Thus, the concrete masonry unit disclosed herein, as used to form the shell of a building, provides substantially enhanced thermal inertia or thermal mass to the building.

In general, there has been provided a concrete masonry unit having a first and second pair of substantially parallel walls disposed to form a rectangular region as viewed in plan. A partition divides the region into at least two cells within the unit. The partition includes an elongate portion disposed in spaced substantially parallel relation to confronting wall surfaces of the unit. Flow passage means serve to pass material in fluid form into each of the cells and laterally out of at least one of the cells. The two cells are substantially bottomless to permit the fluid material to flow downwardly therefrom as well as laterally from at least the one cell noted.

Thus, an energy conserving structure for constructing the exterior wall of a building and for providing solar heating and nocturnal cooling to the interior thereof includes a plurality of masonry units stacked to form a wall in a manner to include vertical mortar joints between adjacent stacked units. Each concrete masonry unit is defined by an inner side wall, an outer side wall and a partition disposed between the side walls. A plurality of cross webs joins the partition to the side walls in a spaced substantially parallel disposition whereby the partition defines an open inner cell with respect to the inner side wall and an open outer cell with respect to the outer side wall. The inner cells are collectively disposed to define a continuous inner wall space. The outer cells similarly are disposed to collectively define a continuous exterior wall space. A thermal mass material is disposed within substantially the entire interior wall space and a material in fluid form capable of thermal insulation is disposed within substantially the entire exterior wall space.

Additionally, it is preferred that the thermal insulation material be an expansive fluid material capable of thermal insulation and settable to a solid state within the exterior wall space so as to seal all potential water leak passages through that portion of the wall containing the insulation material and after expansion of such material.

It is a general object of the present invention to provide a concrete masonry unit of a type having improved insulating characteristics for providing improved thermal inertia or thermal mass within the insulated shell of a building.

It is another object of the present invention to provide a concrete masonry unit of a type suitable for constructing a wall whereby the inner cavities of the concrete wall can be readily concrete grouted and in which insulation can be disposed into the outer cavities of substantially an entire wall by discharging insulation material of a type capable of flowing so as to be placed in co-planar relation to the concrete wall.

It is another object to dispose in co-planar relation within a wall of concrete masonry units, an inner layer of concrete and an outer layer of insulation.

A further object of the invention is to provide a wall of concrete masonry units containing substantially continuous layers of grout and insulation material respectively as inner and outer layers and wherein the insulation expands to fill substantially all potential water leak passages to make the wall water tight.

Yet another object of the invention is to provide a method of forming a water tight wall.

The foregoing and other objects of the invention will become more readily evident from the following description of preferred embodiments when considered in conjunction with the drawings.

FIG. 1 shows a diagrammatic perspective view in section of a wall construction employing concrete masonry units all according to the invention;

FIG. 2 shows a diagrammatic perspective view of a concrete masonry unit according to one embodiment of the invention as employed in the wall of FIG. 1 according to the invention;

FIG. 3 shows a plan view of the concrete masonry unit shown in FIG. 2;

FIG. 4 shows a diagrammatic perspective view of a concrete masonry unit according to another embodiment of the invention for use in constructing corners;

FIG. 5 shows an elevation section view taken along the line 5—5 of FIG. 1 showing a concrete grouted portion of a concrete wall according to the invention;

FIG. 6 shows a diagrammatic perspective view taken along the line 6—6 of FIG. 1 showing that portion of the concrete wall of FIG. 1 containing insulation;

FIG. 7 shows a diagrammatic perspective view of a concrete masonry unit for use in forming a column within a wall structure or at the end edge of a wall structure;

FIG. 8 shows a diagrammatic perspective view of the same embodiment shown in FIG. 7 but of a reverse construction thereto for use in conjunction therewith;

FIG. 9 shows a diagrammatic perspective view in section of a wall construction according to the invention and containing a column formed from the masonry unit of FIGS. 7 and 8;

FIG. 10 and 11 show diagrammatic perspective views of concrete masonry units for use in forming a finished end to a wall of the kind described;

FIG. 12 shows a diagrammatic perspective view of a variation in a detail, according to the invention;

FIG. 13 shows a diagrammatic side elevation view of a concrete masonry unit as shown in FIG. 2, and FIG. 14 shows a diagrammatic perspective view similar to that taken along the 6—6 of FIG. 1 but showing the outer portion of the concrete wall of FIG. 1 foamed in place polyurethane insulation.

Concrete masonry units of the type, for example, as shown in FIG. 2 have been employed herein to provide the major portion of the wall structure 10 which rests on a concrete footing 11. The unit 12, as best shown in FIGS. 2 and 3, generally comprises a pair of substantially parallel face shells or side walls 13, 14, joined together at or near their end edge margins by a pair of substantially parallel spaced apart cross webs or end walls 16, 17 so as to form a rectangle therebetween as viewed in plan. An interior wall or partition 18 extends between end walls 16, 17 to divide the rectangular shape into first and second cells 21, 22. Cells 21, 22, when disposed in the wall of a building, may be referred to respectively, as "inner" and "outer" cells respectively since cells 21 are intended to be next to the interior of the building and cells 22 next to the outside environment. In running bond configuration as shown in FIG. 1, where the vertical mortar joints are staggered, a number of concrete masonry units 12 can be assembled as shown in FIG. 1 with the units stacked to form the wall.

As shown in FIG. 2 the opposite ends of each cell 21, 22 have been cut out to define flow passages 23, 24 at the left end and 26, 27 at their upper right hand ends. As a variation (shown in FIG. 12) unit 12 can be formed with "knock-outs" 25 at opposite ends which can be easily removed at the job site by striking knock-outs 25 with a hammer. The unit 12 is substantially bottomless for passing fluid material vertically.

Accordingly, each cell 21, 22 includes flow passage means leading into and out of the cell for passing material in fluid form into and out of the unit 12. Spacer membranes 28 serve to maintain wall spacing substantially uniform while at the same time being of reduced cross-section so as to transmit only a minimum amount of thermal energy through the wall.

The wall structure 10 shown in FIG. 1 can be readily constructed by stacking units 12 in the manner shown to form a wall thereof. Then as shown in FIG. 5 a suitable source of concrete grout coupled as by means of a concrete grout pump to a hose 29 supplies concrete grout to a large section of the wall via the open bottoms of inner cells 21 and via flow passages 23, 26. Thus, initially grout 31 passes downwardly and laterally through those blocks 12 located beneath hose 29. When the vertical cell under hose 29 fills up, hose 29 is then moved to each successive vertical cell to cause the vertical and lateral flow to be repeated at successive cell positions until the entire series of inner cells 21 are filled with concrete grout. When the grout hardens it forms a rigid wall containing portions of units 12 embedded therein.

In view of the general open nature of this type of construction reinforcing rods 32 can be readily installed to provide the usual reinforcing to the concrete wall.

At this stage cells 21 will be virtually all filled with grout.

A wall of insulation is provided substantially in the same manner by employing insulation of a granular (i.e. fluid) type such as perlite or a foam material such as polyurethane. Thus, as shown in FIG. 6, perlite insulating material 33 supplied from a hopper assembly 65 may be discharged to fill substantially all of the voids or outer cells 22 via flow passages 24, 27.

While the granular type of insulation material has been suitable, a number of significant advantages can be obtained by employing foamed in place polyurethane. Polyurethane foam expands approximately 35 times its original volume and accordingly will fill all potential water leak passages through the wall as the foam expands during the filling of the outer wall portion formed by cells 22. Since the polyurethane sets up to form a solid body of insulation in the outer wall portion, all potential water leak passages and other interstices will be filled thereby serving to seal the wall against penetration of water.

Any polyurethane which leaks through to the outer wall surface can be readily brushed away without any deleterious effect upon surface texture, color or finish.

Thus, a foamed in-place expansive insulation material, such as polyurethane foam, which will not shrink with age, provides a perpetual sealant for the life of the wall.

Further, since the polyurethane will not shrink with age, the insulation will not settle with time in a manner leaving an upper wall portion uninsulated.

In addition to the above advantages, and since the outer surface of the wall will be sealed, the practice of applying a coat of waterproofing material to the outer surface of the wall to prevent moisture penetration can be eliminated.

Accordingly, a method of forming a waterproof wall structure, as shown in FIG. 14, includes the steps of stacking a plurality of masonry units to form a wall in a manner including vertical mortar joints between adjacent stacked units. Masonry units are used of a type having open inner cells and open outer cells. A continuous interior wall space is defined by alignment of the inner cells while a continuous outer wall space is defined by alignment of the outer cells. A thermal mass material disposed within substantially the entire interior wall space includes materials such as grout or the like. The next step is to permit the grout to harden and then to dispose an expansive fluid material of a type which sets-up to form a solid body capable of thermal insulation within substantially the entire exterior wall space in a manner to seal all potential water leak passages through the wall portion containing the expansive material. The insulation material is foamed in-place.

As shown in FIG. 4 a concrete masonry unit embodiment has been provided whereby the corners of a wall can be constructed so as to form a continuation of the wall material carried in cells 21, 22. Thus, a partition 36 or interior wall extends between an end wall 37 and a side wall 38 so as to divide a region within the outer walls thereof into outer cells 40 and inner cells 44.

Cutouts formed in end wall 37 and side wall 38 provide flow passages 39 and 41 and similar flow passages formed through side wall 38.

In order to permit masonry units 12 to be arranged in a running bond configuration it is readily evident that the corner embodiment shown in FIG. 4 must also be provided in a mirror or reverse image thereof.

In constructing a wall it is frequently desirable to provide a column therein. Also, it is necessary to provide a finished end edge to a wall, as shown at the upper right hand end of wall 48 (FIG. 9). Accordingly, as shown in FIG. 7 the concrete masonry unit 45 and the mirror image thereof, 46 shown in FIG. 8, when used alternately as now to be described serve to provide a column 47 of concrete as identified in dotted lines within wall 48. Accordingly, unit 45 includes a pair of end walls 49, 51 and a pair of side walls 52, 53 defining a generally rectangular region as viewed in plan. The partition 54 or interior wall serves to divide this region into at least two cells 56, 57 the latter being subdivided into portions 57a and 57b. Unit 45 is bottomless as noted above with regard to the other units. Cutouts define flow passages 58, 59, 60 whereby a hardenable material such as concrete grout can be pumped in fluid form laterally and vertically into cells 57. After concrete grouting, insulation material in fluid form can be disposed into cells 56 so as to provide the wall with some substantial insulation.

A hopper assembly 65 provides one suitable means for placing granular insulation material into outer cells 22, 56, 56'. Assembly 65 comprises a base 66 formed with depending flanges 67 spaced to capture the upper edge of the wall therebetween and slide along same. Base 66 carries a hopper 68 offset laterally to one side of base 66 to cause an elongate discharge opening extending along the bottom of hopper 68 (and through base 66) to travel along the tops of the outer cells, e.g. 22. Thus, by loading hopper 68 with granular insulation the outer cells can be readily charged with insulation by moving assembly 65 along the upper edge of the wall.

Polyurethane when foamed in place into the outer cells 56, 56' as shown in FIG. 14 serves to waterproof the wall.

Thus, fluid grout flowing into cell portion 57a ultimately passes laterally through flow passage 59 and into the column defined by a succession of cells 57b, 57b'.

As noted in wall construction 48 in FIG. 9 alternate units 45, 46 are provided whereby the cells 57b and 57b' will be aligned to form column 47.

The alternating arrangement of units 45, 46 positions them in the wall in a running bond configuration compatible with the rest of the wall. Further, the half size bottomless unit 62, alternating with the full size unit 64, and formed with flow passages 63, serves to fill out the alternating interstices formed at an end of wall 48 to provide a finished exposed edge surface.

After cells 57 have been grouted with concrete and the material sufficiently hardened, insulating material in fluid form can be disposed into cells 56 and 56' via their open bottoms and horizontal flow passages of adjoining cells 22.

Granular insulation can be readily poured into the cells. Preferably, foamed in place polyurethane is placed initially in liquid form at the bottom of the wall where it begins to expand upwardly and laterally through the open bottoms and ends of the concrete masonry units.

It is known that conventional concrete masonry units having the same exterior dimensions may have different numbers of crosswebs. The unit shown in FIGS. 2 and 3 is generally known as a two core block whereas by the addition of another cross web the unit would be referred to as a three core block. Both types of blocks have been widely used.

Typically in concrete masonry units of this type a standard two core unit includes cross webs in which the area of the cross section of the cross webs occupies approximately twenty-four percent (24%) of the overall area of the side of the unit. In the usual or standard three core masonry units the ratio of cross web cross section area to side wall area increases to something of the order of twenty nine percent (29%) (where the exterior dimensions remain the same as for the two core unit). Thus, both such blocks can be considered to be "standard" masonry units as noted herein.

Specifications for a standard hollow load-bearing concrete masonry unit are defined by the American Society of Testing and Materials (ASTM) and designated C90-75.

By occupying such a high percentage of side wall area, the cross webs of these "standard" concrete masonry units readily conduct thermal energy between the walls of the unit and have been observed to cause substantial transfer of thermal energy into and out of a building shell.

As shown in FIG. 13, the cross-sectional area of the cross webs has been reduced to approximately a third of the area occupied by cross webs in "standard" concrete masonry units as explained above, thereby significantly reducing thermal transfer through the building shell. Stated another way, the cross webs shown herein (i.e. for a two core block) occupy less than ten percent (10%) of the overall side wall surface.

Thus, in FIG. 13 an outer wall surface 14 includes the narrow cross webs 16, 17, 28 shown in invisible lines. Accordingly, the areas of cross webs 16, 17, 28 defined in the side of wall 14 are substantially less than standard masonry units.

By reducing the ratio of the cross section area of the cross webs to the overall side wall area the R value of a wall as disclosed herein will be considerably increased over that of a standard wall under the same circumstances.

Thus, in a ten inch thick, masonry bearing wall reinforced and grouted as disclosed herein, the cross section area of the cross webs to the overall area of the wall will run approximately nine percent (9%). The R value of such a wall is approximately 14.

By comparison, a standard ten inch concrete masonry bearing wall reinforced and grouted at thirty-two inches on centers vertically and forty-eight inches on centers horizontally, free of polyurethane in the grouted cells, and having the same unit weight of concrete in the block, such as one hundred pounds per cubic foot, and using the same unit weight of concrete grout in the wall, such as one hundred forty pounds per cubic foot, and using the same thickness of polyurethane insulation, such as three inches, with all reinforced cells grouted solidly, a standard two core ten inch block employing twenty four percent (24%) cross web area to the overall area of a side wall of the block has an R value of 6.5.

For a similarly arranged standard three core ten inch block having cross webs occupying approximately twenty nine percent (29%) of the area of the side wall the R value is approximately 6.0.

| CONCRETE MASONRY UNIT | CROSS WEB RATIO | R VALUE |
| --- | --- | --- |
| 2 core CMU (as shown) | 9% of sidewall | 14 |
| 2 core CMU (standard) | 24% of sidewall | 6.5 |
| 3 core CMU (standard) | 29% of sidewall | 6.0 |

Even if the grout and reinforcing, required by building codes, were to be replaced entirely with insulation material of the type used in the rest of the wall, the R value for two core and three core standard CMUs would only be raised from 6.5 to 8.0 (2 core CMU) and from 6.0 to 7.0 (3 core CMU). Thus, it is evident that the relatively high R value of the disclosed wall is derived in large part from the limited cross-section area of the cross-webs. It will be readily evident that the concrete masonry units described herein permit a number of units to be disposed in a manner to receive materials in fluid form, either grout or insulation material or the like in respective planes by permitting the material to move in fluid form readily vertically and horizontally from or into a large number of the units at a time.

From the foregoing it will be further evident that there has been provided an improved concrete masonry unit and waterproof wall construction characterized by inner and outer cavities adapted to contain concrete and foamed in place insulation respectively in a manner so as to enhance the thermal inertia of a building and provide layers of concrete and insulation held in co-planar relation within a wall of concrete masonry units.

Finally, it will also be evident that the inner wall spaces, when grouted and reinforced form the reinforced concrete structural portion of the wall while the outer face shells merely confine and protect the insulation.

What is claimed:

1. An energy conserving exterior wall structure of a building for use in passive solar heating and nocturnal cooling of the interior of the building comprising a plurality of masonry units stacked forming a wall in a manner including mortar joints between adjacent stacked units, each masonry unit being defined by an inner side wall, an outer side wall and a partition disposed in spaced relation between the side walls, a plurality of cross webs joining the partition to the side walls in a spaced substantially parallel disposition wherein the partition defines an open inner cell with the inner side wall and an open outer cell with the outer side wall, the cross-sectional area of the cross webs occupying less than substantially ten percent of the overall area of the side walls for minimizing heat transfer between the side walls, the inner cells collectively defining a continuous interior wall space, a fluid material settable to form a thermal mass and structural body disposed within and substantially filling the entire interior wall space, said structural body in conjunction with said inner side walls and said partitions forming the structural portion of said exterior wall, the outer cells collectively defining a continuous exterior wall space, and an expansible insulation material foamed in place within and substantially filling the entire exterior wall space, said insulation material serving to seal said exterior wall space in response to expansion of said insulation.

2. An energy conserving exterior wall structure of a building for use in passive solar heating and nocturnal cooling of the interior of the building comprising a plurality of masonry units stacked at the building construction site forming a substantially complete wall of the building in a manner to including mortar joints between adjacent stacked units, each masonry unit being defined by an inner side wall, an outer side wall and a partition disposed between the side walls, a plurality of cross webs joining the partition to the side walls in a spaced substantially parallel disposition wherein the partition defines an open inner cell with the inner side wall and an open outer cell with the outer side wall, the inner cells collectively defining a continuous interior wall space, a thermal mass and structural material filling substantially the entire interior wall space, the outer cells collectively defining a continuous exterior wall space, and an expansive fluid material capable of thermal insulation and settable to a solid state foamed in place within said exterior wall space to expand through and seal all potential water leak passages through that portion of said wall containing said insulation material, said insulation material filling substantially the entire exterior wall space.

3. The method of forming a wall structure comprising the steps of stacking a plurality of masonry units forming a wall in a manner including mortar joints between adjacent stacked units using masonry units of a type having open inner and outer cells isolated from each other, aligning the inner cells defining a continuous interior wall space, aligning said outer cells to define a continuous outer wall space, filling substantially the entire interior wall space with a fluid material of a type settable providing a solid thermal mass and structural body filling the inner cells thereof, filling the outer cells of substantially the entire exterior wall space with a fluid material of a type which expands and sets up forming a solid body of thermal insulation, and sealing all potential water leak passages through the exterior wall space from within in response to expansion of said body of thermal insulation.

* * * * *